Nov. 1, 1949　　　A. M. BOUDREAU　　　2,486,917
STROLLER-TYPE VEHICLE
Filed June 26, 1948　　　　　　　　　2 Sheets-Sheet 1
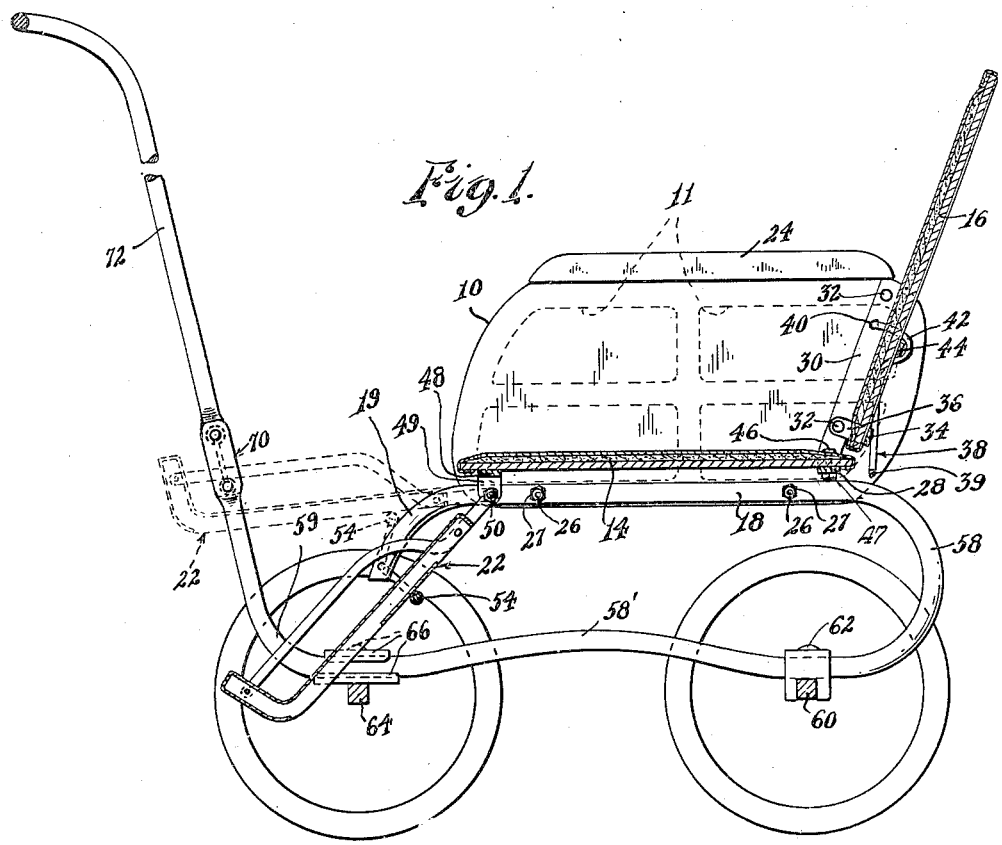

Nov. 1, 1949  A. M. BOUDREAU  2,486,917
STROLLER-TYPE VEHICLE
Filed June 26, 1948  2 Sheets-Sheet 2
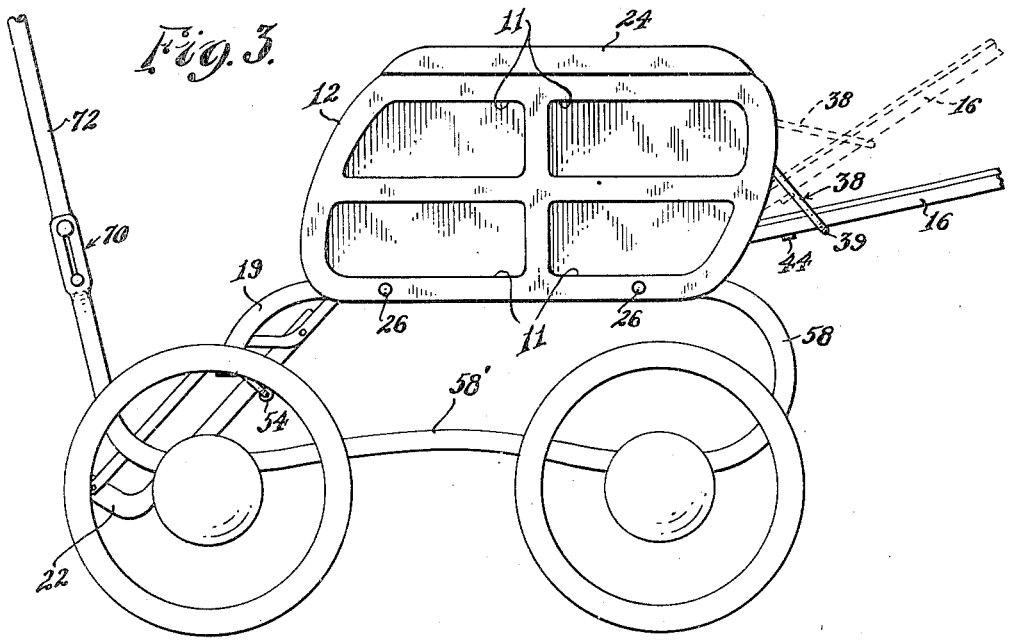
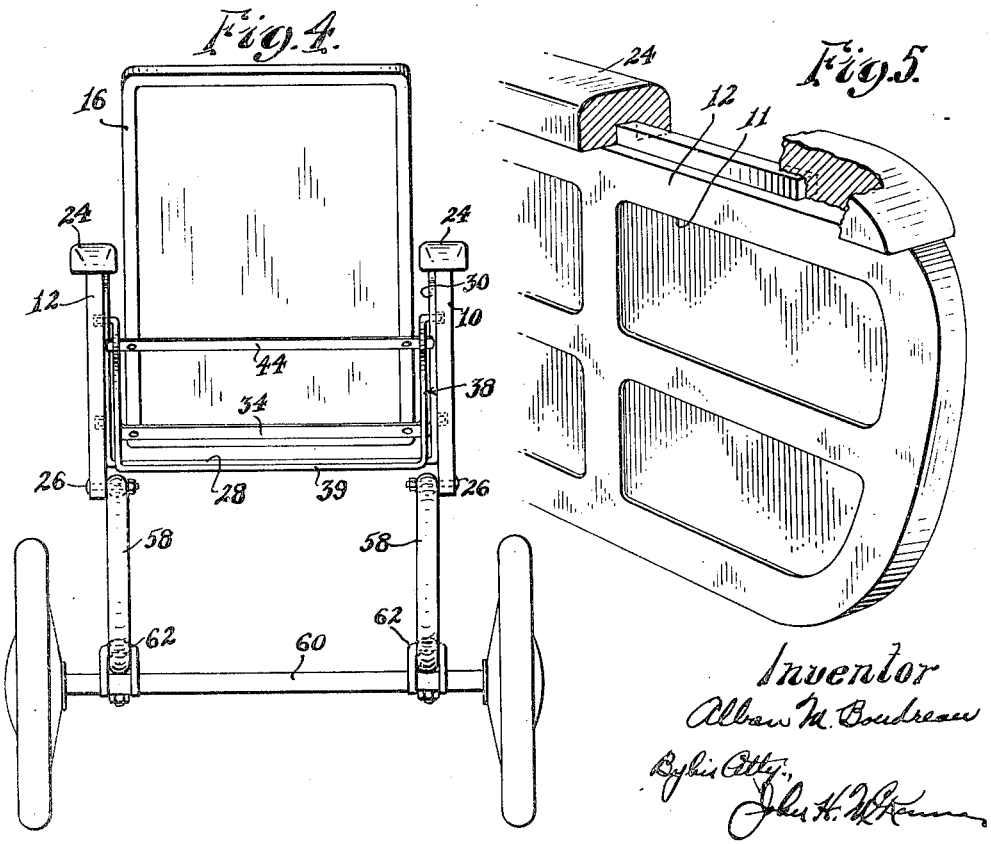
Inventor
Alban M. Boudreau Patented Nov. 1, 1949

2,486,917

UNITED STATES PATENT OFFICE 2,486,917

STROLLER-TYPE VEHICLE

Alban M. Boudreau, Gardner, Mass., assignor to Hedstrom-Union Company, Gardner, Mass., a corporation of Massachusetts Application June 26, 1948, Serial No. 35,502

5 Claims. (Cl. 155—105)

1

This invention relates to improvements in children's stroller-type vehicles and the like. More particularly it provides an improved body for such vehicles and novel means for combining and supporting the body elements relative to each other on the vehicle chassis, with a back-rest and foot-rest readily independently adjustable for their respective selective setting each in different operative positions.

It is among the objects of the invention to provide a stroller body each side of which is a stiff flat panel which desirably may be of plywood whose outer surface may have portions of one or more plies cut away to reveal surface portions of an inner ply which preferably will have a surface aspect providing a distinctive visual contrast with the intact portions of the surface ply, said side panels being effectively and economically secured together in spaced general parallelism and secured to a chassis by inconspicuous means including a supporting part for the vehicle seat.

Another object is to provide a stroller-type vehicle body comprising a seat, an adjustable back-rest, adjustable foot-rest and two stiff body side panels wherein a single bracket constitutes a support for the rear portion of the seat, the major support for the side panels in their generally rigid parallel relation, and the entire support for the back-rest and its retainer, with the back-rest and retainer rotatably adjustable on the bracket for setting the back-rest in selected positions of adjustment.

It is, moreover, my purpose and object generally to improve the structure of stroller-type vehicles and especially such vehicles having panel body elements combined with a seat and an adjustable back-rest on a wheeled chassis.

In the accompanying drawings:

Fig. 1 is a medial cross-sectional elevation of a stroller-type vehicle embodying features of the invention, the foot-rest being shown by full lines and broken lines, respectively, in two different positions of adjustment;

Fig. 2 is a top plan of the vehicle of Fig. 1;

Fig. 3 is a side elevation of the vehicle of Fig. 1 with the pusher handle broken away, and with the back-rest shown by full lines and broken lines, respectively, in two different positions of adjustment;

Fig. 4 is an end elevation looking at the back-rest end of the vehicle but omitting forward parts, for purposes of clearness; and Fig. 5 is a perspective view of a fragment of one of the side panels, with a portion of the arm rest broken away.

2

Referring to the drawings, the stroller body comprises two side panels 10, 12, a seat 14, and an adjustable back-rest 16 operatively associated together on a chassis which includes the two similar generally horizontally disposed tubular members 18, 20 to which the side panels and seat are connected, and on which the foot-rest structure 22 is pivotally mounted for adjustable settings forwardly of the body.

Preferably, each side panel 10, 12 is of plywood having light and dark plies of which the ply at the outer exposed surface of each panel is of light-colored wood having substantial areas cut away to expose corresponding surface areas of an inner dark-wood ply as at 11. The marginal regions of the outer surface ply and the entire inner surface ply preferably are intact, and an arm rest element 24 is secured along the top edge of each panel, preferably with a tongue-in-groove inter-fitting securement, as illustrated in Fig. 5.

According to the invention, each side panel 10, 12 is directly secured to the chassis by two bolts 26, or the like, which extend through the panel at its lower edge region and through the adjacent tubular member 18 or 20, with a nut 27 on each bolt. The panels are maintained in approximately rigid parallelism by a single interior stiff metal bracket member having a horizontal part 28 extending across from one to the other of the panels a little above the tubular chassis members 18, 20, and at the rear end portion of the body, and having integral upwardly extending arms 30, one at each side of the body. Each bracket arm 30 extends obliquely upwardly and rearwardly from the horizontal part 28 to an upper rear edge portion of its panel 10 or 12, and each arm is secured to its panel by screws 32 which stop short of extending through the outer surface of the panel.

The bracket member 28, 30 not only provides a rigid and strong securement of the side panels but constitutes a support for the adjustable back-rest 16. As herein shown, a stiff metal bar 34 extends across and is secured to the lower exterior marginal edge of the back-rest and has its opposite ends turned inward at 36 and pivotally secured each to the adjacent bracket arm 30 by the lower one of the bracket securing screws 32. Hence, the back-rest 16 can swing about the horizontal axis of the lower screws 32. It is releasably held in its position of Fig. 1 by a bent wire generally U-shaped retainer indicated generally at 38, which is pivotally suspended from the bracket arms 30 by reason of an off-set end of each retainer arm engaging in a hole 40 in each bracket arm 30. Each retainer arm, adjacent to its end, is bent as at 42 to provide a relatively small U-shaped portion opening toward the front of the body, and a stiff bar 44 on the back-rest has projecting ends, each adapted to engage in one of the U-bends 42 when the back-rest is in its position of Fig. 1. The coaction of the bar 44 and the U-bends 42 of the retainer securely holds the back-rest against forces tending to swing the back-rest clockwise about its pivot in Fig. 1. However, the back-rest quickly and easily may be lowered by swinging it slightly forward, enough to disengage bar 44 from U-bends 42, after which the retainer may be swung a little counter-clockwise, in Fig. 1, following which the back-rest may be lowered into engagement with the bridge portion 39 of the U-shaped retainer 38, as represented in the dotted showing of Fig. 3.

It will be obvious from the foregoing description, in connection with the drawings, that the single bracket member 28, 30 effectively supports and braces the side panels in their desired approximately parallel relationship, and also pivotally supports the back-rest and the pivoted retainer by which the back-rest may be held in different positions. Additionally, the crossing part 28 of the bracket member constitutes a convenient and effective means to which the rear edge portion of seat 14 may be secured in supported relation to the side panels and back-rest. Two bolts 46 effect this rear securement of seat 14, the heads of the bolts being inconspicuously exposed at the rear end of the upper surface of the seat, and the bolts extending through the seat and through part 28 of the bracket member, with a nut 47 threaded on the lower end of each bolt.

At its forward end, the seat 14 is secured to the tubular chassis members 18, 20 by means of the bar 48 secured to the under surface of the seat and having its opposite ends turned downward to form attaching ears 49, one of said ears being bolted at 50 to the chassis member 18, and the other being similarly bolted at 52 to the chassis member 20. The same bolts 50, 52 pivotally mount the foot-rest structure 22 on the chassis members for swinging adjustments between its full-line and dotted-line positions of Fig. 1. A transverse yoke retainer 54 is pivotally mounted on the down-turned forward end portions 19 and 21 of chassis members 18, 20, for engaging around the foot-rest, as in the full line showing of Fig. 1, or for being swung upward to rest against the portions 19, 21 of the chassis members, as shown by its dotted position in Fig. 1, the foot-rest, in turn, resting on the yoke-retainer in generally horizontal position, as indicated in dotted outline in Fig. 1.

In the embodiment herein represented, each chassis member 18, 20 has integral downwardly bowed extent at 56, 58, at the rear end of the stroller, and each portion 56, 58 extends forwardly into supported engagement with the rear axle 60 to which each is rigidly secured at 62, and further forwardly at 56', 58' over the front axle 64 to which they are rigidly secured as at 66.

Forward of the front axle 64, the chassis elements 56', 58' turn upwardly at 57, 59, and have their ends connected at 68, 70 to the U-arms of a usual pusher handle 72 whose connections at 68, 70 may be such as to permit folding of the pusher handle into a collapsed relation to the stroller body. The back-rest 16 also may be swung forwardly to a collapsed position against seat 14, between the side panels 10, 12.

My improved stroller can have the desired sport-model aspect contributed by the side panels 10, 12, which latter effectively and durably are combined with the seat, back-rest and foot-rest, and with a chassis, to produce an attractively distinctive vehicle having features of structure which effect economies in production and superior utilitarian qualities and characteristics, as compared with prior comparable vehicles. The side panels may be economically produced by mass production methods, and require no covering inside or outside, yet they present attractive surfaces which effectively combine with the seat and back-rest covering materials to provide a generally pleasing over-all effect. The disclosed means for effectively and economically mounting such side panels, including a rear bracket member which also mounts the rear end of seat 14, the back-rest 16 and the pivoted retainer thereof, assures a practically durable stroller body whose back-rest and foot-rest are separately adjustable in a structure which is simple and economical to manufacture and assemble.

I claim as my invention:

1. In a stroller-type vehicle having a pair of generally horizontal chassis members disposed in spaced parallelism, a vehicle body mounted on said members and comprising two stiff side panels, a seat, and an adjustable back-rest, a generally U-shaped stiff bracket having its bridge portion extending under and supporting the rear end of the seat and having its U-arms extending upwardly from the said bridge portion, each traversing the inner surface of a said panel and rigidly secured thereto for maintaining the panels in general parallelism, means securing the lower margin of each panel to a said chassis member, means securing said seat to the chassis members at each side of the forward margin of the seat, means pivotally mounting said back-rest on the U-arms of said bracket with the pivots stopping short of being exposed at the outer surfaces of the side panels, and a retainer for the back-rest pivotally mounted on the U-arms of said bracket and swingable to selective positions for retaining the back-rest in different positions of adjustment.

2. A stroller-type vehicle body comprising a pair of plywood side panels, a generally U-shaped stiff bracket having its bridge portion extending laterally across from one to the other panel at a rear lower edge region thereof and having its U-arms extending upwardly and rearwardly from the bridge portion, each in contact with the inner surface of a panel, means at spaced locations along each U-arm rigidly securing each U-arm to the adjacent panel, said means stopping short of projecting through the outer surfaces of the panels, a back-rest pivotally mounted on said U-arms of the bracket, a yoke pivotally mounted on said U-arms of the bracket and engaging loosely around the back-rest for retaining the latter in different positions of adjustment, a seat having its rear edge portion resting on and secured to the bridge portion of the U-bracket, and means for securing the lower edge portion of each side panel and forward portions of the said seat to supporting chassis elements.

3. A stroller-type vehicle body comprising a pair of stiff side panels, a seat, an adjustable back-rest, a yoke retainer for the back-rest, and a stiff generally U-shaped bracket securing the side panels in spaced vertical parallelism, supporting said seat, and pivotally mounting said back-rest and said yoke retainer, whereby said body may be pre-assembled as a unit for mounting on a chassis, said bracket having its bridge portion extending laterally between the side panels and having each U-arm secured against the inner surface of a different one of the panels, said seat resting on and secured to the bridge portion of the U-bracket and said back-rest and retainer being pivotally mounted on the U-arms of the bracket with the yoke retainer extending loosely around the back-rest for retaining the latter in adjusted positions.

4. In a stroller-type vehicle having a pair of generally horizontal chassis members disposed in spaced parallelism, a vehicle body mounted on said members and comprising two stiff side panels, a seat, and an adjustable back-rest, a generally U-shaped stiff bracket having its bridge portion extending under and supporting the rear end of the seat and having its U-arms extending upwardly from the said bridge portion, each traversing the inner surface of a said panel and rigidly secured thereto for maintaining the panels in general parallelism, means securing the lower margin of each panel to a said chassis member, means pivotally mounting the back-rest on the U-arms of the bracket, a foot-rest forwardly of the vehicle body, means pivotally mounting the foot-rest on said chassis members and also securing the forward portion of said seat to said chassis members, and retaining means respectively for said back-rest and foot-rest for retaining them in selective positions of adjustment about their respective pivots.

5. A stroller-type vehicle comprising a pair of generally horizontal chassis members disposed in spaced parallelism, a pair of plane and stiff panels disposed in spaced generally vertical parallelism, each said panel being secured at a lower edge region thereof and at a plurality of spaced locations along said edge region to a said chassis member, a generally U-shaped stiff bracket member having its bridge portion extending generally in a horizontal plane between said panels and having one of its U-arms extending obliquely upwardly and rearwardly on the adjacent surface of one panel and rigidly secured to said surface toward one end of the panel, and having its other U-arm extending obliquely upwardly and rearwardly on the adjacent surface of the other panel and rigidly secured to said surface toward one end of the panel, a back-rest pivotally mounted on the U-arms of said bracket with the pivotal axis spaced only relatively little above the bridge portion of the bracket, with the back-rest disposed between the panels, a seat resting on and secured to the bridge portion of the U-bracket, and a yoke pivotally mounted on the U-arms of the bracket and loosely embracing said back-rest for retaining the back-rest in selected positions of adjustment about its pivotal axis.

ALBAN M. BOUDREAU.

REFERENCES CITED

The following references are of record in the file of this patent:

UNITED STATES PATENTS

| Number | Name | Date |
|---|---|---|
| 991,150 | Griffith | May 2, 1911 |
| 1,040,602 | Adams | Oct. 8, 1912 |
| 1,057,314 | Adams | Mar. 25, 1913 |
| 1,699,894 | Klem | Jan. 22, 1929 |